(12) United States Patent
Walega et al.

(10) Patent No.: US 12,240,328 B2
(45) Date of Patent: Mar. 4, 2025

(54) P2 MODULE ARCHITECTURE

(71) Applicant: EXEDY GLOBALPARTS CORPORATION, Belleville, MI (US)

(72) Inventors: Kenneth Gerard Walega, Northville, MI (US); Scott William Binder, South Lyon, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 0 days.

(21) Appl. No.: 17/614,182

(22) PCT Filed: May 25, 2020

(86) PCT No.: PCT/US2020/034451
§ 371 (c)(1),
(2) Date: Nov. 24, 2021

(87) PCT Pub. No.: WO2020/243040
PCT Pub. Date: Dec. 3, 2020

(65) Prior Publication Data
US 2022/0219525 A1    Jul. 14, 2022

Related U.S. Application Data

(60) Provisional application No. 62/852,331, filed on May 24, 2019.

(51) Int. Cl.
*B60K 6/387* (2007.10)
*B60K 6/40* (2007.10)
*F16H 45/02* (2006.01)
*B60K 6/48* (2007.10)
*F16H 45/00* (2006.01)

(52) U.S. Cl.
CPC ............... *B60K 6/40* (2013.01); *B60K 6/387* (2013.01); *F16H 45/02* (2013.01); *B60K 2006/4825* (2013.01); *B60Y 2200/92* (2013.01); *F16H 2045/002* (2013.01)

(58) Field of Classification Search
CPC ... F16H 45/02–2045/0492; F16D 27/108–118; F16D 41/125
See application file for complete search history.

(56) References Cited

U.S. PATENT DOCUMENTS

| | | | | |
|---|---|---|---|---|
| 4,079,820 A | * | 3/1978 | Mattli | ..................... F16H 45/00 192/84.91 |
| 4,779,488 A | * | 10/1988 | Takano | ................. F16H 37/021 192/48.607 |
| 10,293,674 B1 | | 5/2019 | Wilton | |
| 2005/0133328 A1 | * | 6/2005 | Masuya | ................. F16H 45/02 192/3.3 |

(Continued)

*Primary Examiner* — Ernesto A Suarez
*Assistant Examiner* — Lillian T Nguyen
(74) *Attorney, Agent, or Firm* — Honigman LLP; Eric J. Sosenko; Jonathan P. O'Brien

(57) ABSTRACT

A device for power transmission between an output of a drive engine and an input of a transmission. The device includes a torque converter, an electric motor at least partially axially overlapping the torque converter, a damper system having an input adapted to be driven by the output of the drive engine, and a clutch coupled between the damper system and the torque converter and configured to connect and disconnect the damper with the torque converter.

13 Claims, 1 Drawing Sheet

(56) References Cited

U.S. PATENT DOCUMENTS

| | | | |
|---|---|---|---|
| 2006/0135268 A1* | 6/2006 | Kim | F16F 15/129 |
| | | | 464/68.4 |
| 2006/0137953 A1* | 6/2006 | Hinkel | F16H 41/24 |
| | | | 192/3.21 |
| 2006/0289209 A1* | 12/2006 | Grosspietsch | B60L 50/16 |
| | | | 180/65.25 |
| 2007/0074943 A1* | 4/2007 | Hemphill | F16H 45/02 |
| | | | 192/3.25 |
| 2008/0023287 A1* | 1/2008 | Thiede | B60L 50/16 |
| | | | 192/48.1 |
| 2008/0060859 A1 | 3/2008 | Klemen et al. | |
| 2008/0072586 A1* | 3/2008 | Hammond | B60K 6/485 |
| | | | 60/330 |
| 2010/0081540 A1* | 4/2010 | Krause | B60K 6/48 |
| | | | 477/3 |
| 2014/0184133 A1 | 7/2014 | Yuuki et al. | |
| 2019/0165659 A1* | 5/2019 | Hattori | H02K 1/276 |
| 2019/0301581 A1* | 10/2019 | Matsuoka | F16H 45/02 |
| 2020/0039496 A1* | 2/2020 | Lindemann | B60W 10/023 |
| 2020/0224733 A1* | 7/2020 | Kato | F16D 43/20 |

* cited by examiner

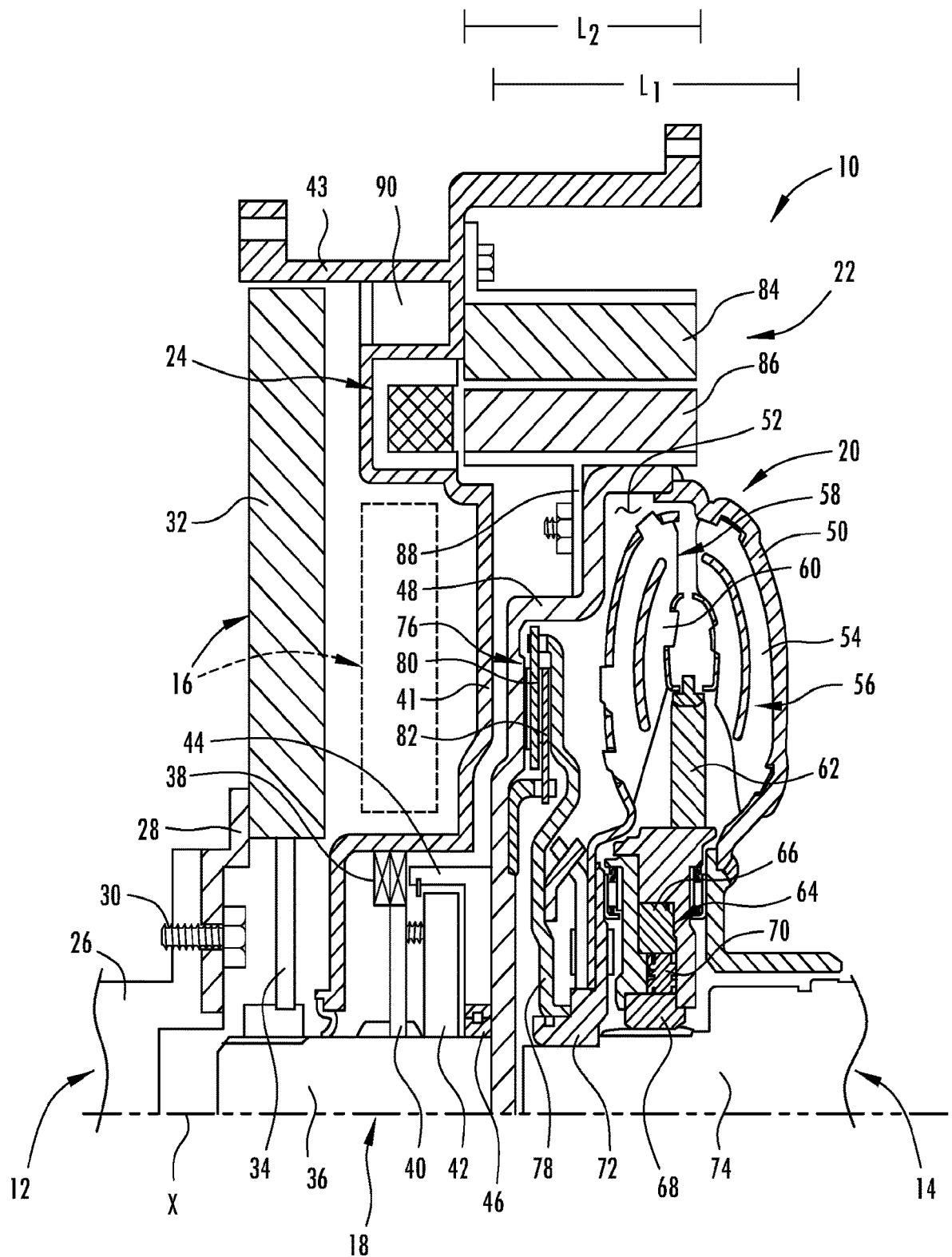

P2 MODULE ARCHITECTURE

CROSS REFERENCE TO RELATED APPLICATION

This application is a non-provisional patent application claiming priority to U.S. provisional application No. 62/852,331, filed May 24, 2019, the entire contents of which are herein incorporated by reference.

BACKGROUND

Field of the Invention

The present invention generally relates to powertrains for motor vehicles and, more particularly, to a P2 module for a hybrid powertrain of a motor vehicle.

Description of Related Art

Today, the automotive industry is increasingly moving away from combustion engine vehicles and toward electric vehicles. One drawback of an all-electric vehicle (EV), however, is the current limitation on battery technology and, resultantly, the mileage range of the vehicle. While drivers who only have short range needs do not consider this a inconvenience, drivers who at least occasionally have mileage needs beyond the typical range of an all-electric vehicle must generally choose between stopping for extended periods of time to recharge the battery or owning a second vehicle for extended mileage range driving.

There is a bridge, however, between these two choices, hybrid vehicles (HV) and plug-in hybrid vehicles (PHEV). Plug-in hybrid vehicles first run on electricity, but utilize a gas engine backup to extend the range of the vehicle. Hybrid vehicles alternate between use of a combustion and an electric motor for higher mileage.

After vehicles with gas or diesel powertrains, consumers next, and increasingly, prefer vehicles with hybrid powertrains.

Various drivetrain architectures exist for hybrid vehicles and are known as P1, P2, P3 and P4 configurations. In a P1 configuration, the electric motor is connected to the combustion engine and located after the combustion engine. A P2 configuration locates the electric motor between the combustion engine and the transmission, and allows for the combustion engine to be disconnected from the transmission. A P3 configuration locates the electric motor between the transmission and the differential. In a P4 configuration, the electric motor directly drives the axles.

Of these configurations the P2 configuration is considered very versatile in that it allows hybrid technology to be incorporated in to existing combustion engine powertrains with minimal modification to the existing powertrain.

SUMMARY

In view of the above, the present invention provides a device for power transmission between an output of a drive engine and an input of a transmission.

In one aspect, the invention provides a device for power transmission between an output of a drive engine and an input of a transmission, wherein the device includes a torque converter defining a central axis; an electric motor connected to the torque converter, the electric motor at least partially axially overlapping the torque converter; and a clutch coupled to the electric motor and the torque converter, the clutch being configured to connect and disconnect the engine with the torque converter.

In another aspect, the torque converter has a first axial length, and the electric motor at least partially axially overlaps the first axial length.

In a further aspect, the torque converter has a first axial length and the electric motor has a second axial length, the second axial length at least partially axially overlapping the first axial length.

In an additional aspect, the torque converter has a first axial length defining a first axial position along the central axis, the electric motor having a second axial length defining a second axial position along the central axis, the second axial position at least partially overlapping the first axial position.

In still another aspect, the electric motor is located radially outward of the torque converter.

In yet a further aspect, a damper system is provided having a damper input and a damper output, the damper input adapted to be driven by the output of the drive engine, the clutch having a clutch input connected to the damper output.

In another aspect, the clutch is axially positioned between the damper system and the torque converter.

In a further aspect, the clutch is located radially inward of the damper system.

In an additional aspect, the damper system at least partially axially overlaps the clutch.

In another aspect, the invention provides device for power transmission between an output of a drive engine and an input of a transmission, the device including a torque converter defining a central axis and having an input member, an output member and a hydrodynamic circuit coupling the input member to the output member; an electric motor having a stator and a rotor, the rotor being connected to the input member of the torque converter and at least partially axially overlapping the torque converter; a damper system having an input and an output, the input of the damper system adapted to be driven by the output of the drive engine; and a clutch coupled between the damper system and the torque converter, the clutch having a clutch input member coupled to the output of the damper system and a clutch output member coupled to the shell of the torque converter, the clutch being configured to connect and disconnect the damper with the torque converter.

In a further aspect, the torque converter has a first axial length defining a first axial position along the central axis, the electric motor having a second axial length defining a second axial position along the central axis, the second axial position at least partially overlapping the first axial position.

In an additional aspect, the second axial position is radially outward of the first axial position.

In yet another aspect, the clutch is an electromechanical clutch.

In still a further aspect, the clutch is axially positioned between the damper system and the torque converter.

In an additional aspect, the clutch is located radially inward of the damper system.

In still another aspect, the damper system at least partially axially overlaps the clutch.

In an additional aspect, the clutch is an electromechanical clutch.

In another aspect, the invention provides a device for power transmission between an output of a drive engine and an input of a transmission, the device including a torque converter having a shell defining chamber, a hydrodynamic circuit provided in the shell and configured to multiply torque inputted to the torque converter, an output hub coupled to the hydrodynamic circuit and adapted to be coupled with the input of the transmission; an electric motor located at least partially radially outward and about the torque converter, the electric motor including a stator and a rotor, the rotor being rigidly connected to the shell of the torque converter; a damper system having an input and an output, the input of the damper system adapted to be driven by the output of the drive engine; an electromagnetic clutch coupled between the damper system and the torque converter, the electromagnetic clutch having a clutch input member coupled to the output of the damper system and a clutch output member coupled to the shell of the torque converter, the electromagnetic clutch configured to connect and disconnect the damper with the torque converter; and a variable flux device located axially adjacent to the electric motor.

In further aspect, the torque converter has a first axial length defining a first axial position along the central axis, the electric motor having a second axial length defining a second axial position along the central axis, the second axial position at least partially overlapping the first axial position.

In an additional aspect, the second axial position is radially outward of the first axial position.

In yet another aspect, the clutch is axially positioned between the damper system and the torque converter.

In still a further aspect, the clutch is located radially inward of the damper system.

In an additional aspect, the damper system at least partially axially overlaps the clutch.

In another aspect, the variable flux device located axially adjacent to the rotor of the electric motor.

In still another aspect, the variable flux device is located radially outward of the electromagnetic clutch.

In yet a further aspect, the variable flux device axially overlaps the electromagnetic clutch.

In another aspect, the invention provides a P2 module of a hybrid powertrain for power transmission between a rotary output of a drive engine and a rotary input of a transmission, the P2 module including a torque converter having a shell defining chamber, an impeller having a plurality of impeller blades extending into the chamber and being connected to the shell, a turbine located in the shell and being supported for rotation relative to the shell, the turbine including a plurality of turbine blades generally opposing the impeller blades, an output hub rotatably supported with in the shell and coupled to the turbine, the output hub being configured to connect with the rotary input of the transmission; an electric motor located at least partially radially outward and about the torque converter, the electric motor including a stator and a rotor, the rotor being rigidly connected to the shell of the torque converter and rotatable therewith, the stator being non-rotatable; a damper system having an input adapted to be driven by the rotary output of the drive engine, the damper also having an output; an electromagnetic clutch positioned between the damper system and the torque converter, the electromagnetic clutch having a clutch input member coupled to the output of the damper system and a clutch output member coupled to the shell of the torque converter, the electromagnetic clutch being configured to connect and disconnect the damper with the torque converter; and a variable flux device located axially adjacent to the electric motor and radially outward of the electromagnetic clutch, the variable flux device at least partially axially overlapping the electromagnetic clutch.

In another aspect, the torque converter has a first axial length and the electric motor having a second axial length, at least 50% of the second axial length overlaps the first axial length.

In an additional aspect, the torque converter has a first axial length and the electric motor having a second axial length, at least 75% of the second axial length overlaps the first axial length.

Further objects, features and advantages of this invention will become readily apparent to persons skilled in the art after review of the following description, including the claims, and with reference to the drawings that are appended to and form a part of this specification.

BRIEF DESCRIPTION OF THE DRAWING

FIG. 1 is a schematic cross-sectional view of a P2 module incorporating the principles of the present invention.

DETAILED DESCRIPTION

As used in the description that follows, directional terms such as "upper" and "lower" are used with reference to the orientation of the elements as presented in the FIGURES. Accordingly, "upper" indicates a direction toward the top of the FIGURE and "lower" indicates a direction toward the bottom of the FIGURE. The terms "left" and "right" are similarly interpreted. The terms "inward" or "inner" and "outward" or "outer" indicate a direction that is generally toward or away from a central axis of the referred to part whether or not such an axis is designated in the FIGURES. An axial surface is therefore one that faces in the axial direction along the axis. A radial surface therefore faces radially, generally away from or toward the central axis. It will be understood that in actual implementation, the directional references used herein may not necessarily correspond with the installation and orientation of the corresponding components or device.

Referring now to the drawing shown in FIG. 1, a device, a P2 module, embodying the principles of the present invention is generally illustrated therein and designated at 10. The P2 module 10 is positioned between the combustion engine 12 and the transmission 14 of a motor vehicle, which may be an automotive vehicle. As illustrated in FIG. 1, the complete engine 12 and transmission 14 are not illustrated. Rather, the respective output and input components of each are illustrated, relative to the central axis X of the P2 module 10, and further discussed below.

The P2 module 10 includes as it principal components a damper system 16, a disconnect clutch 18, a torque converter 20, an electric motor 22, and a variable flux device 24. Generally, the damper system 16 is positioned between the combustion engine 12 and the electromagnetic clutch 18. The clutch 18 is located under the damper system 16 and between the damper system 16 and the torque converter 20. The torque converter 20 includes a hydrodynamic circuit that can multiply input torque and output the torque to transmission 14. The electric motor 22 is positioned radially outward of the torque converter 20 and, as such, at least partially surrounds the outer periphery of the torque converter 20. The variable flux device 24 is located axially adjacent to the electric motor 22. The collective use and arrangement of the components, as outlined above, advantageously reduces the axial package size of the P2 module 10 and, as will be appreciated by those skilled in the art, can be incorporated into both rear wheel drive and front wheel drive configurations.

The output of the combustion engine 12 is transferred by a crankshaft 26 to the damper system 16 by an input plate 28, which is secured to the crankshaft 26 by fasteners 30 or other means. In one embodiment, and as generally illustrated, the damper system 16 includes dual mass flywheel 32 to attenuate torsional vibrations from the engine 12. An output plate 34 of the damper system 16 couples the dual mass flywheel 32 to the input member 36 of the disconnect clutch 18. While the damper system 16 is shown as incorporating a dual mass flywheel 32, it will be appreciated that the damper system 16 may incorporate other vibration damping systems and/or mechanisms without departing from the scope of the present disclosure.

In contrast to current P2 modules, the P2 module 10 disclosed herein does not incorporate a hydraulic or wet clutch to disconnect the combustion engine 12 from the torque converter 20. Rather, the disconnect clutch 18 of the present P2 module 10 is an electromagnetic disconnect clutch 18. The electromagnetic disconnect clutch 18 significantly reduces the axial and radial package space requirements as compared to conventional wet or mechanical disconnect clutches.

The clutch 18 generally includes a fixed stator and activation coil 38 that, when energized, interacts with a translator 40 mounted of axial movement along the input member 36 of the clutch 18. The stator and activation coil 38 are shown mounted to an inner surface of a face plate 41 forming part of the housing 43 of the P2 module 10. Movement of the translator 40 toward the pocket plate pocket plate 42 deploys struts internal to the pocket plate 42 to engage the notch plate and transmit torque to the torque converter 20 through the clutch 18. When the coil 38 is actuated to the disengaged position, the translator 40 is biased away from the pocket plate 42 allowing the struts to retract into the pocket plate and torque is no longer transmitted through clutch 18. U.S. Pat. No. 9,377,061 discloses one such electromagnetic clutch and is herein incorporated by reference in its entirety. Electromagnetic clutches are generally well known and appreciated by those skilled in the art and, accordingly, variations on the clutch 18 may be used and may be required by the specific design criteria during implementing of the architecture disclosed herein.

As mentioned above, the notch plate 44 is fixedly connected to the torque converter 20. More specifically, the notch plate 44 is fixed to a front cover 48 of the torque converter 20 and supported for rotation relative to the input member 36 of the clutch 18 by a bearing 46.

At its radial periphery, the front cover 48 is secured to a rear cover 50 by a weld, or other suitable means, to form a fluid tight chamber 52. The front cover 48 defines the engine side of the torque converter 20, while the rear cover defines the transmission side of the torque converter 20.

Internally, the rear cover 50 is provided with a series of blades or vanes 54 so as to form an impeller 56. During rotation of the rear cover 50, hydraulic fluid is supplied from the automatic transmission and is forced radially outwardly under the centrifugal force generated by the rotating impeller blades 54. The impeller blades 54 also directs the hydraulic fluid forward, in a direction away from the rear cover 50. In FIG. 1, outward motion of the hydraulic fluid is toward the top of the FIGURE and forward motion of fluid is toward the left of the FIGURE.

Immediately forward of the impeller 56, the torque converter 20 includes a turbine 58. The turbine 58 is also formed with a series of blades 60. The turbine blades 60 are oriented to receive the hydraulic fluid from the impeller blades 54. The force of the fluid received from the impeller 56, as well as the shape of the turbine blades 60 themselves, rotationally drives the turbine 58 in the same direction as the rotational direction of the impeller 56. The hydraulic fluid received by the turbine 58 is in turn re-directed inward and rearward, back to the impeller 56.

Positioned between the impeller 56 and the turbine 58 is a stator 62. The stator 62 receives the hydraulic fluid being returned from the turbine 58 to the impeller 56. The stator 62 intercepts the fluid from the turbine 58 and redirects the fluid so that its rotational direction is aligned with the rotational direction of the impeller 56. This redirection is conducted in such a manner that the returned hydraulic fluid is efficiently received by the impeller 56 in a manner that does not impede rotation of the impeller 56, but that instead augments rotation allowing for a multiplication of the torque passing through the torque converter 20. With the inclusion of the above fluid coupling, rotation from the engine 12 is transferred as rotation to the transmission 14 of the vehicle.

Integrated with the stator 62 is a one-way clutch assembly 64 that limits rotation of the stator 62 to a single direction and improves torque transfer efficiency. The one-way clutch assembly 64 includes an outer race 66 upon which the stator 62 is mounted. The one-way clutch assembly 64 also includes an inner race 68 and roller elements 70, the latter of which are located between the outer and inner races 66, 68. The inner race 68 of the one-way clutch assembly 64 is mounted upon a fixed, nonrotating support shaft (not shown) associated with the input of the transmission. In the interest of brevity, and since one-way clutch assemblies are well known in the field of the present invention, those skilled in the art will really appreciate the construction and operation of the one-way clutch assembly 64. As such, the one-way clutch assembly 64 is not and need not be explained in greater detail.

The turbine 58 is supported by an output hub 72, which is mounted on the input shaft 74 of the transmission 14.

Adjacent the front cover 48 a lock-up clutch assembly 76 is provided. When engaged, the lock-up clutch assembly 76 locks rotation of the front cover 48 with the output hub 72 and the input shaft 74 of the transmission 14, generally bypassing the fluid coupling between the impeller 56 and the turbine 58. The lock-up clutch assembly 76 includes a clutch piston 78 radially supported by the output hub 72. A friction plate 80 may be supported by the clutch piston 78 to engage an inner surface of the front cover 48 and a friction plate 82 supported thereby, in the lock-up condition.

Engagement of the lock-up clutch assembly 76 is controlled by axial movement of the clutch piston 78. In this regard, the clutch piston 78 is radially supported on the output hub 72 so as to be axially and rotationally moveable relative to the output hub 72. When an engaging pressure is provided from the transmission 14, via hydraulic fluid, the clutch piston 78 is moved toward the front cover 48 and the friction plate 80 and clutch piston 78 engage the front cover 48 and the friction plate 82 supported thereby. When a disengaging pressure is provided from the transmission 14, also via hydraulic fluid, the clutch piston 78 and its friction plate 80 are separated from the front cover 48 and its friction plate 82.

Forward of the turbine 58, generally in a position between the turbine 58 and the lock up clutch assembly 76, the torque converter 20 may include a damper (not shown), which operates to further absorb variations in the rotation speed of the output from the engine 12. Dampers of this general type are well known in the field of the present invention and those skilled in the art will really appreciate the possible constructions, variation and operations of such a damper. Accordingly, the damper is not be explained in further detail herein.

The electric motor 22 is positioned radially outward of the torque converter 20, in a position so as to at least partially axially overlap and surround the shell of the torque converter 20, the shell being defined by the front and rear covers 48, 50. Preferably, the electric motor 22 significantly axially overlaps the torque converter 20, meaning that greater than 50% of the electric motor's stator 84 and rotor 86 axially overlap the torque converter 20. As illustrated, the electric motor 22 axially overlaps the torque converter by more than 75%. This overlapping construction significantly decreases the axial packing size of the P2 module 10. As seen in the FIGURE, the torque converter 20 has an axial length L1 defining a first axial position along the axis X and the electric motor 22 has an axial length L2 defining a second axial position along the axis X that at least partially overlaps the first axial position.

The rotor 84 of the electric motor 22 rigidly and fixedly connected to the front cover 48 of the torque converter 20 by a bracket 88 orienting the rotor 86 coaxially with the central axis X. The stator 84 of the electric motor 22 it located radially outward and about the rotor 86 and is support by a bracket 90, mounted to the housing 43, so as to also be coaxially with the central axis X. When the electromagnetic clutch 18 is engaged and disconnects the engine 12 from the torque convertor 20, operation of the electric motor 22 will drive the rotor 86 and input rotation into the torque converter 20 via the connection of the rotor 86 to the front cover 48.

Preferably, the electric motor 22 is a torque dense, compact electric motor having as minimal a radial dimension as feasible for the design criteria of the hybrid powertrain.

As previously mention, a variable flux device 24 may be located axially adjacent to the electric motor 22, and more specifically the rotor 86 of the electric motor 22. If provided, the variable flux device 24 may be secured to the front face 41 between the rotor 86 and the damper assembly 16. Alternatively, the damper assembly 16 may be located radially between the variable flux device 24 and the electromagnetic clutch 18, such that the variable flux device 24 is axially positioned between the rotor 86 and the combustion engine 12. One example of variable flux device 24 that may be used in connection with the P2 module described herein is disclosed in U.S. Patent Application Publication No. 2020/0112282 A1, published Apr. 9, 2020, which is herein incorporated by reference in its entirety.

During high speed operation of the electric motor 22, the variable flux device 24 reduces back electro-motive force by accelerating collapse of the magnetic field. During starting mode operation of the vehicle, such as starting of the vehicle after stopping at a stop light, the electric motor 22 transmits torque via the rotor 86 to the torque converter's front cover 48, through the clutch 18 and damper assembly 16 to start the engine 12. During this starting mode, the variable flux device 24 boosts the magnetic flux during the low speed operation of the electric motor 22 increasing the electric motor torques available for starting the combustion engine 12.

Immediately adjacent to the variable flux device 24, preferably radially outward thereof, a flux device cooling jacket 90 is provided to cool the variable flux device 24. The cooling jacket 90 may be formed as a cooling channel integrated into the face plate 41 and/or housing 43 and configured to receive cooling fluid, circulated as part of the engine's cooling circuit or independently thereof.

In addition to the engine start mode described above, the P2 module 10 may be operated in a mode where the just the combustion engine 12 provides torque to the torque converter 20 through the damper assembly 16 and electromagnetic clutch 18 (the electric motor 22 being off), in a mode where just the electric motor 22 provides torque to the torque converter 20 through the rotor 86 (the combustion engine 12 being off); a combined mode where both the combustion engine 12 (as noted above) and the electric motor 22 (as noted above) provide torque to the torque converter 20, and a regeneration mode where torque is transmitted from the wheels of the vehicle, through the transmission 14 and torque converter 20, into the electric motor 22 where the resultant electricity is used to recharge the battery of the vehicle.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A device for power transmission between an output of a drive engine and an input of a transmission, the device comprising:
   a torque converter defining a central axis;
   an electric motor connected to the torque converter, the electric motor at least partially axially overlapping the torque converter; and
   a clutch coupled to the electric motor and the torque converter, the clutch being configured to connect and disconnect the engine with the torque converter; and
   a damper system having a damper input and a damper output, the damper input adapted to be driven by the output of the drive engine,
   wherein the clutch has a clutch input driven by the damper output, and the clutch being located radially inward of and being at least partially axially and outwardly overlapped by the damper system, and
   whereby torque is transmitted from the engine to the clutch input, through the clutch input to the clutch output during engagement of the clutch input with the clutch output, and from the clutch output directly to the torque converter.

2. The device according to claim 1, wherein the clutch is an electromechanical clutch.

3. A device for power transmission between an output of a drive engine and an input of a transmission, comprising:
   a torque converter having a shell defining chamber, a hydrodynamic circuit provided in the shell and configured to multiply torque inputted to the torque converter, an output hub coupled to the hydrodynamic circuit and adapted to be coupled with the input of the transmission;
   an electric motor located at least partially radially outward and about the torque converter, the electric motor including a stator and a rotor, the rotor being rigidly connected to the shell of the torque converter;
   a damper system having an input and an output, the input of the damper system adapted to be driven by the output of the drive engine;
   an electromagnetic clutch coupled between the damper system and the torque converter, the electromagnetic clutch having a clutch input member coupled to the output of the damper system and a clutch output member directly coupled to the shell of the torque converter, the clutch input member and the clutch output member being rotatable relative to each other when disengaged with each other, the clutch further being located radially inward of and being at least partially axially and outwardly overlapped by the damper system, whereby torque is transmitted from the engine to the clutch input, through the clutch input to the clutch output, and from the clutch output directly to the torque converter, the electromagnetic clutch configured to connect and disconnect the damper with the torque converter by connecting and disconnecting the clutch input with the clutch output; and a variable flux device located axially adjacent to the electric motor.

4. The device according to claim 3, wherein the torque converter has a first axial length defining a first axial position along a central axis of the torque converter, the electric motor having a second axial length defining a second axial position along the central axis, the second axial position at least partially overlapping the first axial position.

5. The device according to claim 4, wherein the second axial position is radially outward of the first axial position.

6. The device according to claim 3, wherein the clutch is axially positioned between the damper system and the torque converter.

7. The device according to claim 3, wherein the clutch is located under and radially inward of the damper system.

8. The device according to claim 3, wherein the damper system at least partially axially overlaps the clutch.

9. The device according to claim 3, wherein the variable flux device located axially adjacent to the rotor of the electric motor.

10. The device according to claim 3, wherein the variable flux device is located radially outward of the electromagnetic clutch.

11. The device according to claim 10, wherein the variable flux device at least partially axially overlaps the electromagnetic clutch.

12. The device according to claim 3, wherein the torque converter has a first axial length and the electric motor having a second axial length, at least 50% of the second axial length overlaps the first axial length.

13. The device according to claim 3, wherein the torque converter has a first axial length and the electric motor having a second axial length, at least 75% of the second axial length overlaps the first axial length.

* * * * *